Figure 1:
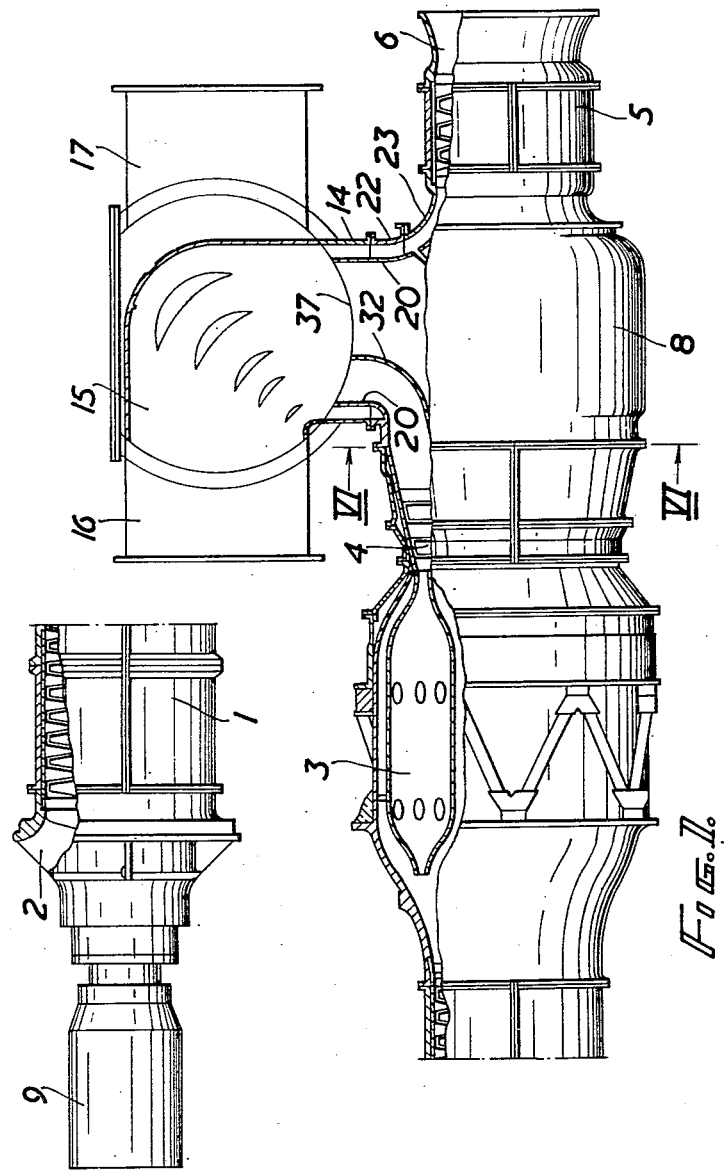

June 25, 1957     A. J. PENN     2,796,732
GAS PRODUCING APPARATUS OF THE GAS TURBINE TYPE
Filed May 7, 1954     4 Sheets-Sheet 1

INVENTOR
ALFRED JOHN PENN

BY Watson, Cole, Grindle & Watson
ATTORNEYS

June 25, 1957 A. J. PENN 2,796,732
GAS PRODUCING APPARATUS OF THE GAS TURBINE TYPE
Filed May 7, 1954 4 Sheets-Sheet 2

*INVENTOR*
*ALFRED JOHN PENN*

BY *Watson, Cole, Grindle & Watson*
*ATTORNEYS*

June 25, 1957 A. J. PENN 2,796,732
GAS PRODUCING APPARATUS OF THE GAS TURBINE TYPE
Filed May 7, 1954 4 Sheets-Sheet 3

INVENTOR
ALFRED JOHN PENN

BY Watson, Cole, Grindle
Watson
ATTORNEYS

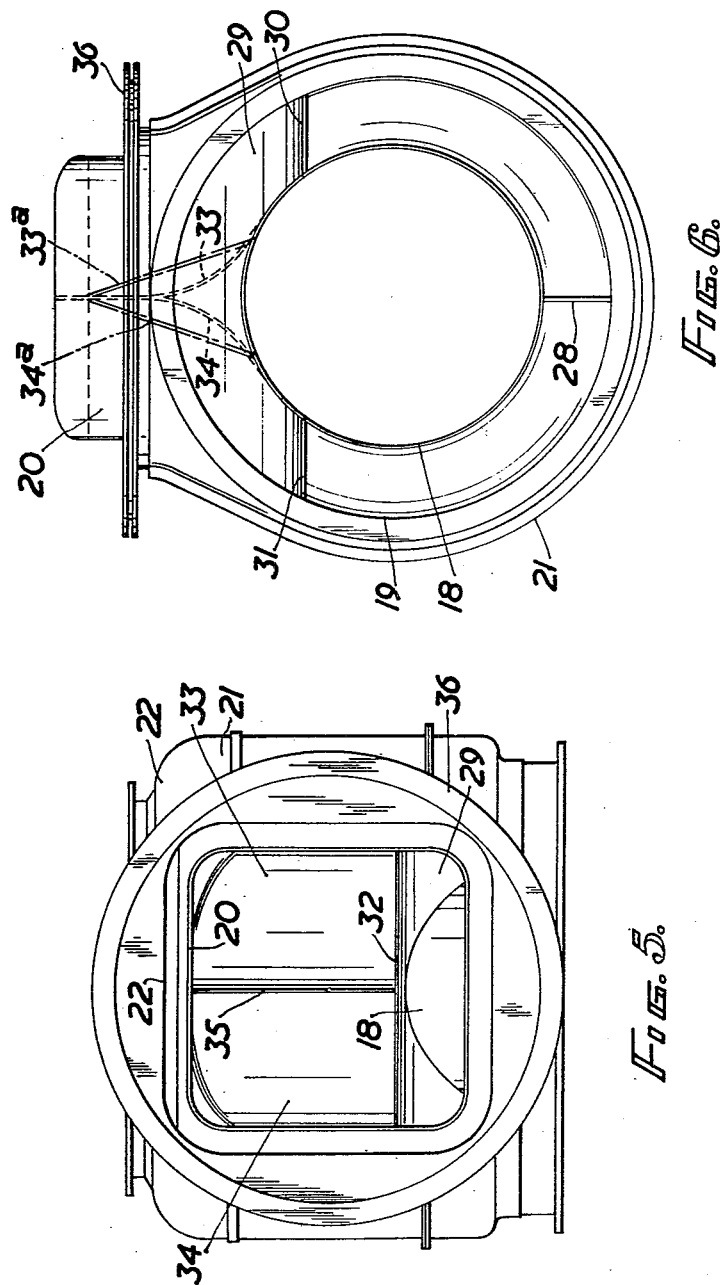

2,796,732
Patented June 25, 1957

2,796,732
GAS PRODUCING APPARATUS OF THE GAS TURBINE TYPE

Alfred John Penn, Northwood, England, assignor to D. Napier & Son Limited, London, England, a company of Great Britain Application May 7, 1954, Serial No. 428,323

Claims priority, application Great Britain May 12, 1953

4 Claims. (Cl. 60—39.17)

This invention relates to gas producers of the gas turbine type.

It is an object of the invention to provide a gas producer which will reduce the disadvantages and problems which occur in dealing with gas at the normal exhaust temperatures of a gas turbine. It is a further object of the invention to provide a gas producer which will provide a relatively greater weight of cooler gas rather than a relatively smaller weight of hot gas, and the invention is thus particularly, though not exclusively applicable to gas producer units for jet operated helicopters and the like.

According to the present invention a gas producer unit of the kind referred to comprises a first air compressor arranged to deliver air to one or more combustion chambers, a turbine arranged to be driven by the products of combustion, and arranged also to drive the first compressor, a second compressor also driven by the turbine and ducting into which the exhaust gas from the turbine (hereinafter referred to as the turbine exhaust) and the compressed air from the second compressor are delivered and from which they are discharged through a single discharge conduit to form the required power gas.

In a preferred construction the first compressor is of the axial flow type and is arranged coaxial with the turbine and with the second air compressor, which is also of the axial flow type, and the second air compressor is spaced from the turbine on the side thereof remote from the first air compressor, the flow through the two compressors being in opposite directions, and generally towards one another, and the ducting thus conveniently lies at least partly between the turbine and the second compressor.

According to another preferred feature of the invention, at least part of the air from the second air compressor is delivered to a cooling jacket at least partly surrounding part of the ducting through which the turbine exhaust flows.

Thus at least part of the relatively cool air from the second air compressor may be delivered to a cooling jacket surrounding a hot gas duct within the discharge conduit, whence the relatively cool air may issue in the form of a "sheath" surrounding the relatively hot "core" of turbine exhaust gases.

Moreover in a preferred construction the second air compressor is driven from the turbine by a shaft passing through the ducting, and the ducting includes an inner hot exhaust jacket surrounding but spaced from the shaft, and an outer cooling jacket surrounding the hot exhaust jacket, the second air compressor being arranged to supply air to the cooling jacket.

The power gas from the ducting may be delivered to a two-way rotary valve, having connections to the point where the gas is required, or to exhaust.

Figure 2:
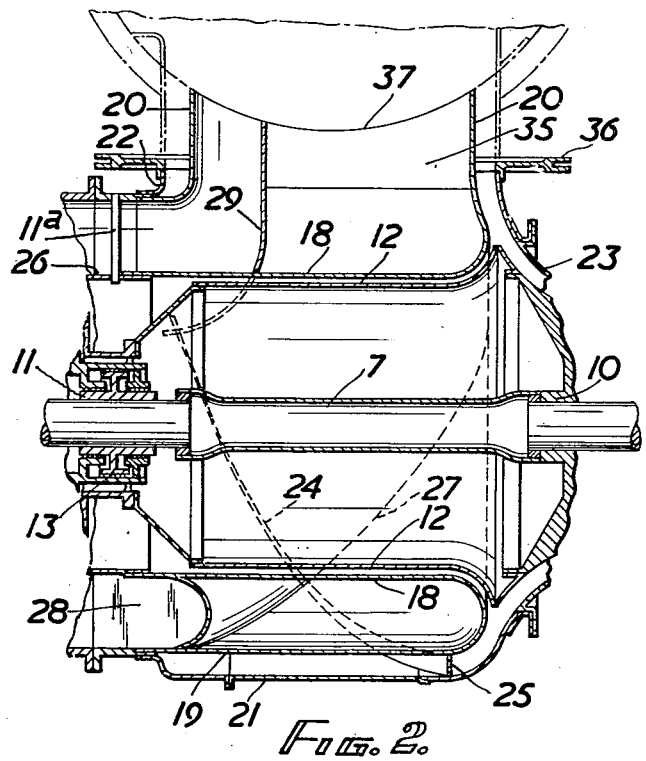

The invention may be performed in various different ways but one specific embodiment will now be described by way of example, with reference to the accompanying drawings, in which, Figure 1 is a side elevation partly broken away of a gas producer according to the invention, arranged to deliver gas to a two-way non-throttling valve, Figure 2 is a sectional view on an enlarged scale of the ducting between the turbine of the gas producer and the second compressor.

Figure 3:
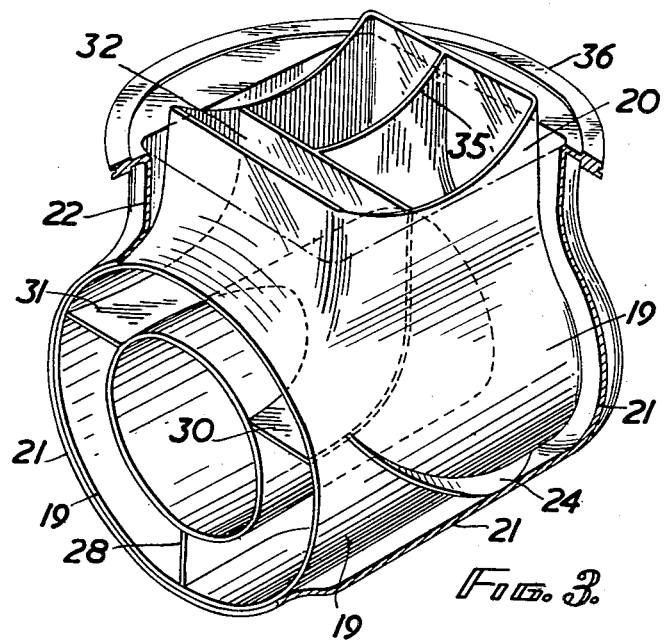
Figure 4:
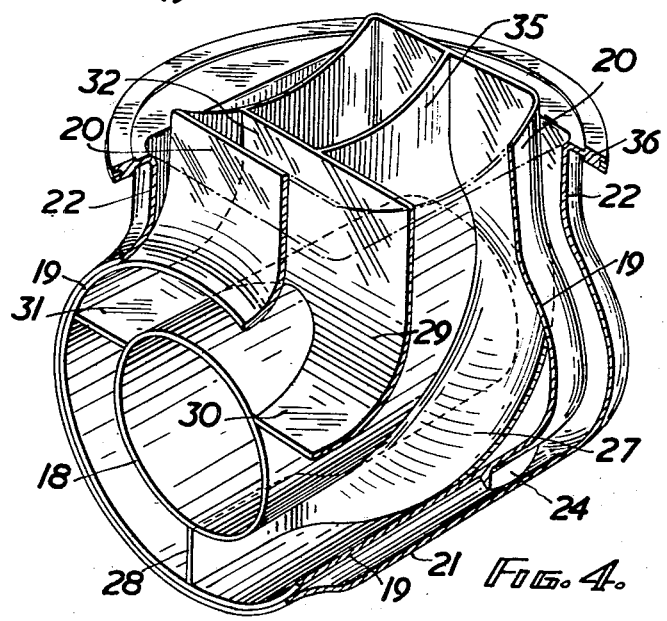

Figure 3 is a perspective view of the ducting shown in Figure 2, with part of the outermost wall of the ducting broken away, Figure 4 is a perspective view of the ducting, with part of the outer and intermediate walls of the ducting broken away, Figure 5 is a plan view of the ducting, and Figure 6 is an end elevation of the ducting on the line VI—VI of Figure 1.

The gas producer illustrated generally in Figure 1 is designed specifically for use with a helicopter of the kind in which gas is supplied to nozzles arranged at the tips of the rotor blades whence the gas issues in the form of jets to propel the rotor. For such a purpose it is clearly desirable that at least the outer boundary layers of the gas supplied should not be at an excessively high temperature, owing to the resultant difficulties in allowing for thermal expansion of parts, in lubricating relatively movable parts, and in constructing all parts subject to the gas of high temperature materials.

The gas producer illustrated comprises in general a first axial flow compressor 1, having an annular air intake 2, and annular ring of axially arranged combustion chambers 3, in which fuel is burnt in known manner and a two-stage turbine 4, arranged to be acted upon by the products of combustion issuing from the combustion chambers. A second axial flow compressor 5, having a somewhat lower compression ratio than the first compressor 1, is arranged coaxial with the first compressor and turbine, though spaced somewhat therefrom, and is provided with an air intake 6, and is arranged to discharge in a direction generally towards the outlet of the turbine 4. The second compressor 5 is driven from the turbine 4 through a shaft 7 (see Figure 2) passing through the ducting arranged between the turbine and the second compressor, and the first compressor is also driven in normal manner by a shaft connected to the turbine and extending in the opposite direction. Thus in effect both compressors and turbine are mounted on a single shaft. A starter motor 9, which may be of any known kind, is mounted on this same shaft on the air intake side of the first compressor.

The construction of the turbine and compressors themselves may be of any known kind, and since these parts in themselves form no part of the present invention they will not be described in detail herein.

The shaft 7 between the turbine 4 and the second compressor 5 is supported in bearings 10 and 11, carried by spokes or vanes secured to fixed parts of the casing of the complete assembly, and the two bearings 10 and 11 and the shaft 7 are surrounded by a generally cylindrical gastight shell 12 as shown in Figure 2. The bearings may also include gas seals of the labyrinth type, as indicated somewhat diagrammatically at 13, and ducts may be provided (not shown) for the supply of cooling air to the bearings and to the space enclosed by the shell 12.

The ducting 8 constituting the receiving chamber between the turbine and second compressor is arranged to receive exhaust gases from the turbine, and compressed air from the compressor, and to deliver them through the duct indicated generally at 14 in Figure 1, to a rotary two-way non-throttling valve 15, which is arranged in one position to deliver the gases to a duct 16, which is connected to the rotor of the helicopter, or in another position to a duct 17 leading to exhaust, or to a straight jet nozzle.

The ducting 8 is illustrated in detail in Figures 2, 3, 4, 5 and 6, and comprises an inner cylindrical wall 18 surrounding but spaced from the cylindrical shell 12, which encloses the shaft 7; an intermediate wall 19, also of generally cylindrical form, surrounding but appreciably spaced from the wall 18, and formed with an upwardly extending generally rectangular duct 20 opening into its upper portion; and an outer wall 21, also of generally cylindrical form and surrounding but spaced from the intermediate wall 19, and having a somewhat similar but larger generally rectangular duct 22 opening into its upper surface, and surrounding the duct 20. The outer wall 21 is united to the intermediate wall 19 adjacent the discharge side of the turbine 4, and at its side adjacent to the second compressor 5, the wall 21 is connected to the casing member 23 constituting the outer wall of the annular discharge duct of that compressor. Two fixed guide vanes 24, are arranged within the cylindrical space enclosed between the outer wall 21 and the intermediate wall 19, one on either side of the axis of this space, these vanes, being united to one another in the form of a V-junction, somewhat resembling a plough share, at the lower part of this enclosed space, and adjacent the discharge opening of the second compressor 5.

The two vanes 24 are upwardly inclined at a mean angle of approximately 45°, and are united to the intermediate wall, and make a loose fit with the outer wall, in order to allow for thermal expansion of the parts relative to one another. Thus it will be seen that compressed air issuing from the second compressor is divided into two streams and guided in an upward direction by the vanes 24 as it passes through the cooling jacket formed by the space enclosed between the outer wall 21, and the intermediate wall 19, and the two streams are reunited and issue as a jacketing stream through the space encloesed between the rectangular ducts 20, 22. A proportion of the air discharged from the second compressor 5 is tapped over through the annular passage between the cylindrical shell 12 and the inner wall 18 (as best seen in Figure 2) and exhausted through vent pipes 11ª, and serves to assist in maintaining the shaft 7 and the associated bearing 10 and 11 at a reasonable temperature.

The inner cylindrical wall 18 is united to the intermediate wall 19 adjacent the discharge side of the second compressor 5, and at its end adjacent the discharge side of the turbine 4 and wall 18 is united to a sleeve 26 defining the inner wall of the annular discharge orifice from the turbine. The intermediate wall 19 at its end adjacent the turbine is united to part of the casing defining the outer wall of the annular discharge orifice from the turbine, and it will be seen that the two walls 18 and 19 thus define an annular cylindrical space which merges into an upwardly extending rectangular duct defined by the duct 20. Two fixed guide vanes 27 are arranged within the space enclosed between the inner and intermediate walls 18 and 19 one on either side of the axis of the shaft 7, these vanes being united to one another at the lower part of the enclosed space adjacent the discharge orifice of the turbine, so as to form a single dividing vane 28 which divides the exhaust gas leaving the turbine into two streams which pass on either side of the cylindrical wall 18 and are upwardly deflected by the vanes 27. The two vanes are upwardly inclined at a mean angle of approximately 45°, and are united as by welding to both the intermediate wall 19 and inner wall 18.

An additional curved guide vane 29 is arranged within the space enclosed between the walls 18 and 19 to assist in deflecting the exhaust gases issuing from the turbine in an upward direction. This vane 29 is formed with two curved extensions 30, 31, which extend in a generally horizontal plane towards the annular discharge orifice of the turbine, being positioned at roughly two thirds of the overall diameter of the turbine from the lower portion thereof and merge into a generally vertical portion 32, which extends across the duct 20. Two further fairing walls 33, 34 are united to the sides of the inner wall 18 and are arranged within the duct 20, converging towards one another in an upward direction and uniting into a single vertical wall 35, so as to assist in the reuniting of the two streams of exhaust gas after being deflected upwards by the fixed vanes 27. These faring walls 33, 34 which act primarily to assist the streamline flow of the gas, may be curved or formed as plate-like members as shown at 33ª, 34ª, in Figure 6.

The upper rim of the rectangular duct 22 is provided with a flange 36, by which it is secured to the casing of a two-way rotary valve 15, which comprises an inner rotary member arranged to deflect the gas issuing through the duct 14 either into the duct 16, from which it passes to the helicopter rotor, or to the exhaust duct 17. The valve 15 is designed to minimise any throttling effect during change-over of the valve from one position to the other.

It will be seen that the rectangular duct 20, which separates the relatively hot exhaust gases discharged from the turbine from the relatively cool jacketing stream of air issuing from the second compressor 5, extends upwards above the flange 36 to a point closely adjacent to the extremity of the rotary part 37 of the valve. This construction tends to maintain the jacketing stream or "sheath" of relatively cool air surrounding the "core" of relatively hot exhaust gases, during their passage through the valve, and thus minimises the dangers and difficulties which might arise if this valve were overheated.

Moreover the jacketing stream of cooling air may be preserved in some cases in the duct or ducts on the downstream side of the valve 15, to avoid overheating this duct.

It will be understood that the compression ratio of the second compressor 5 will be suitably chosen in relation to the compression ratio of the first compressor 1, and the characteristics of the turbine 4, so as to provide substantially matched pressures at outlet from the duct 14 over the whole range of operating conditions of the gas producer plant.

What I claim as my invention and desire to secure by Letters Patent is:

1. A gas producer comprising a first air compressor, at least one combustion chamber to which air is delivered from the first compressor, means for supplying fuel to said combustion chamber, a turbine arranged to be driven by the products of combustion and arranged also to drive the first compressor, a second air compressor also driven by the turbine, and ducting into which the exhaust gas from the turbine and the compressor air from the second compressor are delivered and from which they issue through a single discharge conduit to form the required power gas, the first compressor and the turbine being of the axial-flow type and being arranged co-axially with the second air compressor, the turbine lying between the two compressors, and the ducting being situated at least partly between the turbine and the second air compressor, the direction of flow through the second compressor being opposite to the direction of flow through the first compressor.

2. A gas producer comprising a first air compressor, at least one combustion chamber to which air is delivered from the first compressor, means for supplying fuel to said combustion chamber, a turbine arranged to be driven by the products of combustion and arranged also to drive the first compressor, a second air compressor also driven by the turbine, ducting into which the exhaust gas from the turbine and the compressor air from the second compressor are delivered and from which they issue through a single discharge conduit to form the required power gas, a shaft driving the second compressor from the turbine, said shaft passing through the ducting, the ducting including an inner hot exhaust jacket surrounding but spaced from the shaft, and an outer cooling jacket surrounding but spaced from the hot exhaust jacket, the second compressor being arranged to deliver cooling air to the cooling jacket.

3. A gas producer as claimed in claim 2 in which the ducting includes curved deflector surfaces arranged to direct the exhaust gases from the turbine and the air from the second air compressor into the discharge conduit.

4. A gas producer comprising a first air compressor, at least one combustion chamber to which air is delivered from the first compressor, means for supplying fuel to said combustion chamber, a turbine arranged to be driven by the products of combustion and arranged also to drive the first compressor, a second air compressor also driven by the turbine, ducting into which the exhaust gas from the turbine and the compressor air from the second compressor are delivered and from which they issue through a single discharge conduit to form the required power gas, both air compressors and the turbine being of the axial-flow type, the direction of flow through the second air compressor being opposite to the direction of flow through the first air compressor and turbine, the ducting being arranged between the turbine and the second air compressor, and the discharge conduit being arranged perpendicular to the turbo-compressor axis, the ducting including an inner cylindrical sleeve surrounding but spaced from the shaft connecting the turbine to the second compressor, an intermediate sleeve spaced from the inner sleeve and forming an annular inlet opening communicating with the turbine outlet, a duct continuous with the intermediate sleeve and leading into the discharge conduit, said intermediate sleeve having inclined deflector surfaces arranged to deflect the hot exhaust gases to the last named duct, and an outer sleeve spaced from the intermediate sleeve and forming an annular inlet opening which communicates with the outlet from the second compressor, and forming with the intermediate sleeve and the said duct a cooling jacket extending also toward the discharge conduit.

References Cited in the file of this patent

UNITED STATES PATENTS

| 2,588,532 | Johnson | Mar. 11, 1952 |
| 2,653,446 | Price | Sept. 29, 1953 |
| 2,688,371 | Pesaro | Sept. 7, 1954 |

FOREIGN PATENTS

| 597,954 | Great Britain | Feb. 6, 1948 |